Patented Oct. 18, 1927.

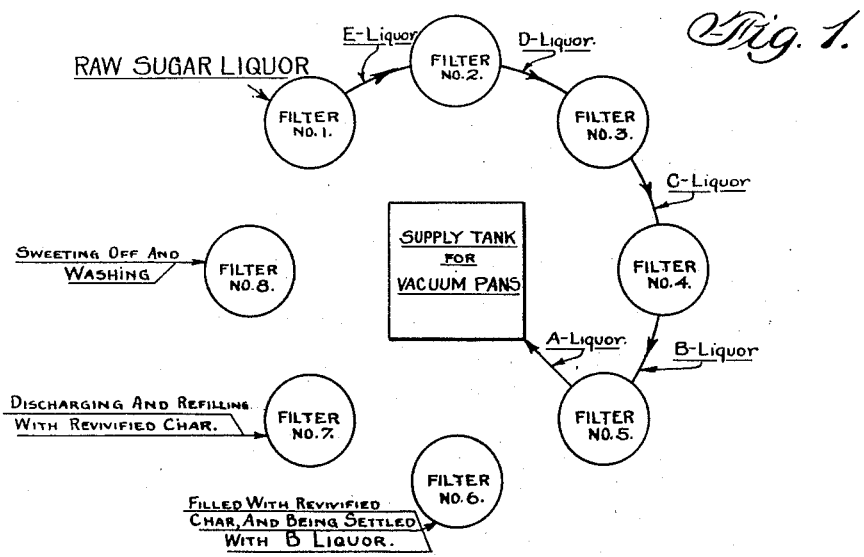
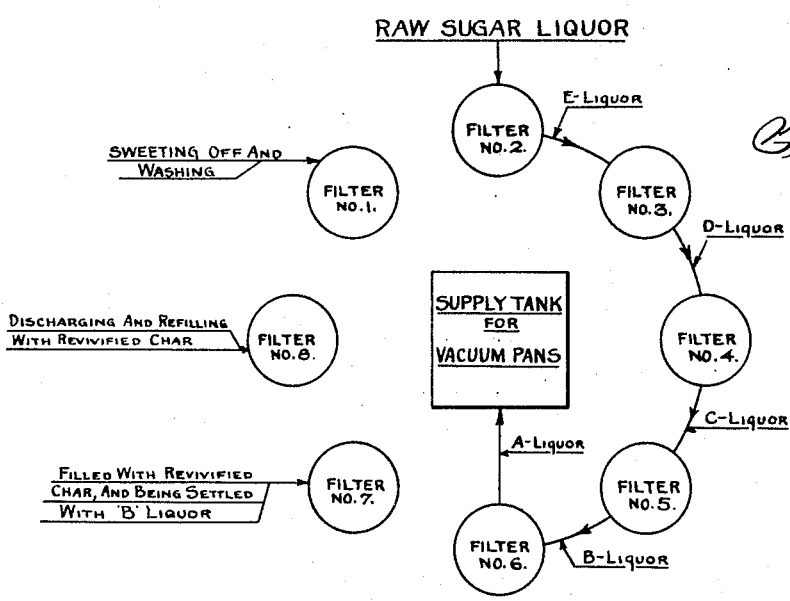

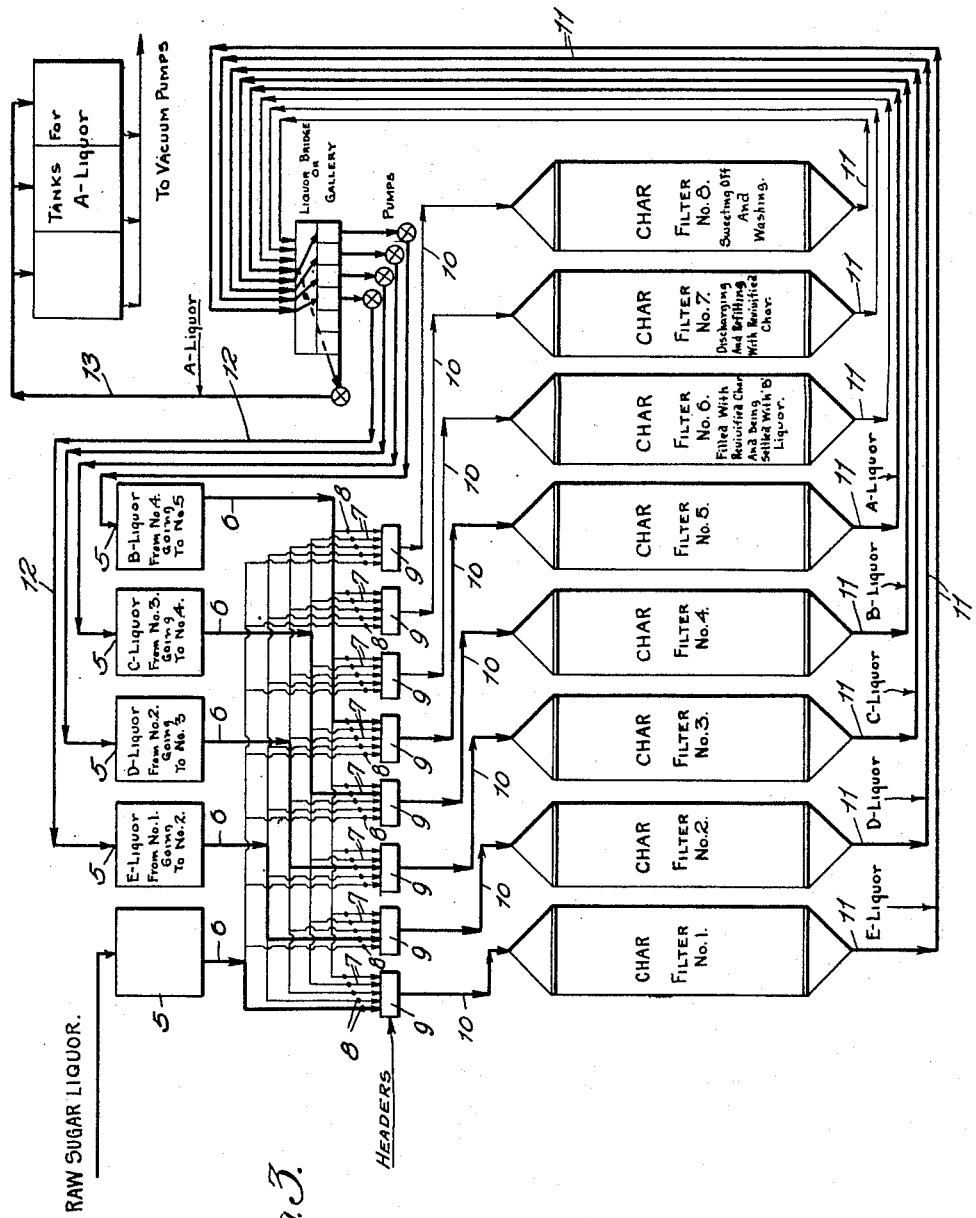

1,646,079

UNITED STATES PATENT OFFICE.

EUGENE E. BATTELLE, OF NEW YORK, N. Y.

PROCESS OF PURIFYING LIQUIDS AND MAKING SUGAR.

Application filed July 22, 1924. Serial No. 727,548.

The invention relates to a novel process and apparatus for the purification and decolorization of juices and solutions, and more particularly to juices of sugar cane and sugar beets, and solutions of the sugars thereof for use in sugar refining.

Objects and advantages of the invention will be set forth in part hereinafter, or will be obvious herefrom to, or may be ascertained by practising the invention by, those skilled in the art.

The invention consists in the novel steps, sequence of steps and processes, and apparatus and parts and arrangements of apparatus herein shown and described.

I have discovered that in the purification of liquids and solutions of certain kinds, and especially in the purification of sugar liquors with animal charcoal (bone black or char), or other suitable agent, that the char is selective in its function both in removing impurities such as coloring matter, and also in its absorption of soluble impurities contained in the sugar solutions from which the refined sugar is produced.

I have discovered that the char or like agent, has greater affinity for certain of the impurities, that is, generally speaking, the char will not absorb certain of the impurities contained in the liquor so long as certain other of the impurities in the liquor are available. For convenience I designate these latter as the impurities for which the char has greater "affinity". The former kind of impurities may be conveniently designated as "obstinate" or "refractory" impurities.

I have further discovered that as the purifying process progresses, and the char absorbs the impurities for which it has greatest affinity, the difficulty of absorption of impurities by the partly saturated char increases. That is, the char has a gradually diminishing affinity for the impurities as their removal from the solution progresses; and this is particularly or more intensively true with respect to the more obstinate impurities.

I have discovered also that freshly revivified char (that is, char which has been renewed or rejuvenated in the usual manner) will absorb the obstinate or refractory impurities from a sugar liquor or solution which has already been partially purified by previous or preliminary char filtration. That is, if a partially purified solution is subjected to the action of new or renewed char, the liquor or solution at this time containing only relatively obstinate or refractory impurities, these will be rapidly and efficiently removed by the new or revivified char.

I have discovered further that this char, which has thus absorbed and removed from the liquor or solution these obstinate or refractory impurities, is subsequently capable of efficiently absorbing from other lower purity liquors or solutions additional impurities for which it has greater affinity. That is, after a partly purified liquor or solution, containing only refractory impurities, has been subjected to the action of new or revivified char and these impurities have been removed from the liquor and absorbed by the char, if the char is then brought into contact with a liquor or solution of lower purity, that is, one containing impurities of greater affinity, the char will have the capacity of efficiently absorbing these impurities of greater affinity.

In the preferable manner of practicing my invention, I grade or classify the sugar liquor, or other solution or liquor, into a plurality of grades by the degree or amount of impurities contained therein or still contained therein. In practice, I have found that classification or separation into two grades is sometimes sufficient; although this gradation may be greatly extended, dependent upon the nature of the liquor to be treated and its requirements. Thus the gradation and the process progresses from the raw or initial impure liquor, by two or more steps, up to the final purified liquor, which is sent to the vacuum pans to be boiled into white refined sugar.

My process includes further the gradation of the char or like purifiying agent as a corresponding and cooperative factor with the gradated liquors to be purified. That is, the revivified char is sequentially brought into contact first with the partially purified liquor, whereby the renewed char may directly attack the refractory and obstinate impurities in the absence of those for which it has most affinity. When it has done its work on these, it is brought into contact subsequently (due to the gradation of the liquors) with the impurities for which it has greater affinity and which it still possesses the capacity to absorb and remove. It will be understood that certain features of the process may be utilized without others so far as concerns the broader aspects of the invention. It will be further understood that in commercial practice, and in connection with various suitable forms of apparatus, the process may be carried out continuously and more or less automatically.

In the commercial practice of my invention, this grading or classifying both of the char and the sugar liquors (the former according to its saturation or degree of absorptive and purifying power, and the latter as to both color and purity) is preferably effected by utilizing char filters (which may be of any standard or suitable kind or form) and operating a plurality of these filters as a single filtration unit or cycle.

In the application of the process to sugar purification, it will be understood that the sugar liquors or solutions, before being submitted to my purification and decolorization process, may be first submitted, if desired, to any known or efficient methods of clarification, to remove insoluble matter or other matters present therein which are not removable by, or which may be inimical to, the filtration process.

As a practical, exemplary illustration of a commercial installation and the practice therewith of my process, a battery or group of char filters for the refining of some grades of raw cane sugar is arranged into units, say, of eight filters each. These eight filters are operated together in an alternating unit or cycle. That is, five of the filters will be run together in purifying the liquor, and the remaining three filters of this unit will at the same time be in the process of "sweetening off", washing, emptying and being filled with char from the revivifying kilns. That is, each filter will participate successively in the different stages or gradations of the purifying process, both as to the condition of the char and the degree of purity of the liquor. When the filter is completely saturated or exhausted, it will be cleaned and recharged with char and will begin again on the cycle. The entire unit will function as described at all times during the filtration process, and will consist of sufficient units to obtain the required capacity in refined sugar, the numbers given above being merely those which would be found useful under certain commercial conditions.

In the accompanying drawings Figs. 1 and 2 are diagrammatic views of a battery of eight filters, Fig. 1 illustrating the liquor flow in one stage, and Fig. 2 illustrating tne liquor flow in the next stage.

Fig. 3 shows diagrammatically the filters and connections in a practical installation.

Assuming by way of illustration, that a cycle or unit of say eight filters is started on a new run, the raw or initial impure liquor is successively filtered through the various filters of the unit. That is, it is filtered through filter No. 1, and passes thence through filter No. 2, and successively through filter No. 5. The practically pure, white liquor from filter No. 5 is sent to the vacuum pans to be boiled into white refined sugar. The rate of flow to and from the cycle or unit of filters will be regulated to allow time for the char in each filter to effectually function on the liquor passing therethrough.

As the process proceeds, the completely purified liquor flows from the fifth filter of the unit to the vacuum pans so long as this liquor is of the requisite purity to be boiled into white refined sugar. This under certain commercial conditions would be about twelve hours or longer. During this stage of the process, the initial impure liquor continues to flow into the first filter of the unit, the intermediate filters functioning on the corresponding grade (or degree of purity) of liquor corresponding to its position in the unit.

Coming now to the second stage, illustrated in Fig. 2 of the drawings, when filter No. 5 begins to run "off color", or begins to discharge liquor below the requisite degree of purity and color, filter No. 6, containing new or freshly revivified char, is cut in and filter No. 1 is cut out of the unit or cycle. That is to say, the off color or impure liquor from filter No. 5 instead of continuing to the vacuum pans is passed through filter No. 6 and thence to the pans; while the initial raw or impure liquor, instead of passing through filter No. 1 is now sent primarily to filter No. 2. Filter No. 1 is now out of action, and its char is "sweetened off", washed, emptied from the filter, and the filter is filled with freshly revivified char; after a filter has been filled with revivified char, it may be settled with liquor in the usual manner.

Thus it will be seen, that in this exemplary practical installation, the first unit removed the impurities for which the char has greatest affinity, the successive filters acting in like manner on the gradually purifying liquor, and that the liquor or solution with only the more obstinate or refractory impurities retained therein, is subjected at the beginning to the action of the revivified char in the later and last filters. This condition is renewed and re-established as the fresh and revivified units one after the other are cut in to act upon the partially purified liquors.

It will be seen also that each filter is gradually progressively advanced or changed to act upon liquor of greater impurity; that is, revivified char attacks first a liquor containing only the more refractory or obstinate impurities, and after it has absorbed these, and having still its capacity for absorption of the impurities of greater affinity, it is advanced to act upon these latter, until it finally acts upon the raw or initial impure liquor.

Referring again to the specific installation exemplarily described hereinbefore, and resuming the discussion of the process at the same point, in due time the liquor from filter No. 6 becomes "off color", and filter No. 7 is cut in to receive the liquor from filter No. 6. At the same time, filter No. 2 is cut out of the unit or cycle, the char therein is "sweetened off", washed and emptied, and the filter is filled with revivified char. Thus at a later stage, when the liquor from No. 7 runs "off color", filter No. 8 is cut in and filter No. 3 is cut out of the unit or cycle; and when filter No. 8 runs "off color", filter No. 1 is cut in, and the cycle of filtration continues uninterruptedly in like manner during the entire purification period.

In commercial practice of my invention, the actual number of filters to be employed, the contact time of the liquor with the char in each filter, and the period of time for which each final filter will deliver liquor to the vacuum pans, is dependent upon the purity and nature of the sugar solution to be purified and decolorized, and also on the degree of purification desired. Sufficient filters are required in each case to obtain a satisfactory refined liquor from the final filter in the unit or cycle, and also sufficient additional filters to permit the proper "sweetening off," washing, discharging, and recharging of the filters with revivified char in time for each to be cut into the unit or cycle without causing delay in the flow of the raw liquor to the unit or cycle and the flow therefrom of the refined or purified liquor of the requisite quality.

Fig. 3 shows diagrammatically a practical lay-out. This figure shows a battery of eight char filters, the first five of which are filtering and the other three of which are temporarily out of action, as illustrated in Fig. 1. In Fig. 3, 5 indicates a plurality of receiving tanks, from which lead pipes 6, which connect with a plurality of pipes 7 controlled by valves 8, in such way that liquor flowing from any given tank 5 may be delivered to any one of the eight headers 9, which through pipes 10 deliver to the eight respective char filters.

Pipes 11 conduct the liquor leaving the char filters to the liquor bridge or gallery shown on Fig. 3, from which point the liquor is directed into the pipes 12 and thence into the appropriate tank 5.

As illustrated in Fig. 3, the raw liquor enters the first of the tanks 5, and, as indicated in the heavy lines passes through filter No. 1, forming E liquor, which passes to the liquor bridge, thence through pipes 12 to the second tank 5, thence through filter No. 2, forming D liquor, then through the liquor bridge and pipes 12 into the third tank 5, then through filter No. 3, becoming C liquor, and so on through filters 4 and 5, the A liquor from the fifth filter, here filter No. 5, passing through the pipes 13 to the tanks for the A liquor, and subsequently passing to the vacuum pans. This is the flow shown in Fig. 3.

When the liquor leaving filter No. 5 becomes off color filter No. 1 is cut out, filter No. 6 is cut in so that filters 2, 3, 4, 5, and 6 do the filtering, all as diagrammatically illustrated in Fig. 2.

When the liquor leaving filter No. 6 becomes off color filter No. 2 is cut out, filter No. 7 is cut in so that filters 3, 4, 5, 6 and 7 do the filtering; and so on in regular order through the whole series of filters.

In the foregoing exemplary description of my process, I have specified animal or bone char as the decolorizing and purifying agent, for the reason that practically all existing refineries are equipped to use this material, but any of the vegetable decolorizing carbons, or other suitable materials, may be utilized in the practice of my process. In the practical work of purifying or refining sugar, the action of the char on the impurities in any sugar solution depends upon the duration of the contact of the solution with the char (in usual practice this is from three to five hours); upon the temperature during the contact period (which in usual practice is from 160° to 190° F.), and also upon the density and nature of the impurities in the liquor and which must be absorbed by the char. From consideration of these factors, the advantages and novel features of my invention as now disclosed, will be obvious, in part at least, to those skilled in the art.

Assuming by way of example, that a sugar refinery under existing operating conditions allows the liquor to flow through the filters at a rate requiring four hours of contact, a battery or filtration unit of eight filters, five of which are acting on the liquor progressively, and three of which are being renewed, will give the total contact time of all liquor which the char at five times four hours, or twenty hours in all, instead of the present practice of providing a contact of only from three to five hours.

Solid matters and other impurities contained in sugar solutions treated by my process are acted on by several times their weight of char. The different parts or units of the char are of different absorptive powers or properties, and are varied or classified in any desired number of degrees. The relation of the absorptive power of the char to the kinds of impurities still carried in the liquor is regulated for the best results. These conditions, realized by my process, give not only the previously described protracted action of the char upon the liquor without increasing the actual elapsed time, but it causes the char to attack each kind of impurity when at its greatest efficiency, and increases the absorptive capacity of the char by reason of its attacking first the obstinate impurities and later those for which it has greater affinity. That is, the process packs or saturates the char with impurities which it would not absorb directly from the initial liquor (due to the affinity of the char for other impurities), and then progressively permits the char to act on other impurities for which it progressively has greater natural affinity.

My invention may also be regarded as providing a continuous char filter of indefinite length, which is continually renewed or rejuvenated at one end, while it is likewise continually excised or discontinued from the other end, the purification process meanwhile continuing uninterruptedly under the most efficient and naturally advantageous conditions and unaffected by the recurrent changes in the filter.

Some of the advantages of the invention are as follows:

More efficient absorption of impurities in sugar solutions by char through this scientific application of the char to solutions so treated.

The conversion of the entire initial sugar liquor treated into practically a pure colorless sugar solution which will boil directly into white refined sugar, as compared with present results which consist of part pure sugar liquor, and the remainder of dark colored solution, which must be boiled back into "off sugars" and subsequently returned for rechar-filtration, re-boiling, etc.

The production of a better grade of refined sugar due to eliminating the returned sugars above referred to.

Increase in the quantity of refined sugar from a given quantity of raw material, of equal purity, over present refining methods. This is due to the greater absorption of impurities from the initial impure sugar solution by the char—these impurities determining the quantity of residual syrup produced in any refining process and, in turn, the quantity of unrecoverable crystallizable sugar contained therein.

A reduction in the quantity of char required for the refining of any given impure sugar solution.

A substantial reduction in refining costs through the larger yield of refined sugar, through the necessity of less char to be revivified, and a material saving in labor, fuel and equipment now required for the working up of return or remelt sugars resulting from the dark colored syrup produced by existing refining methods.

My invention also is directed to or comprises a process for directly producing refined sugar from sugar juices, thereby obviating the necessity of first producing a raw sugar, and subjecting the raw sugar to a subsequent refining process, as is now the usual commercial practice. My new process results in a material increase in the yield of refined sugar, and at a substantial saving in production costs over the existing double process of producing the raw sugar from the juice and subsequently refining the raw sugar.

This novel process comprises subjecting the raw sugar juices or liquids to my novel clarification process, the clarified juices then being subjected to the cycle filtration process already described. The result is a pure, sparkling liquor, which may be turned into white refined sugar by the usual process of evaporation and crystallization.

It will be understood that my clarification process is likewise and independently applicable to the refining of liquors or solutions made from raw sugar.

In the refining of raw cane sugars my clarification or carbonation process together with my cycle filtration process will produce a better grade of refined sugar, will increase the available amount thereof, and will reduce refining costs through the increased yield of sugar, the requirement of less char, and through the saving effected in labor, fuel and equipment.

The application of my clarification and filtration process to beet root juices will result in a better grade and larger yield of refined sugar, a decrease in the quantity of lime required for clarification, and a decrease in the expense of operating the Steffens department (desugarizing the molasses), through a reduction of molasses produced and a saving in fuel and equipment.

Referring now to the present preferred manner of practicing my clarification process, it consists broadly in treating the more or less impure sugar liquor or solution with lime, in quantity determined by the later steps of the process, and the application of heat. This is followed by treatment of the limed and heated solution with carbon dioxide, filtration of the carbonated solution, precipitation of practically all the lime remaining in the filtered liquor, this step being followed by a final filtration of the liquor. The product of this process is a liquor which is easily and completely decolorized and purified by filtration with animal char or vegetable carbons.

Describing the process now more in detail, lime is added to the original impure sugar solution, which solution may be of any density below sixty-five per cent of solids. The lime is added usually or preferably in the form of milk, saccharate or caustic lime; and only in quantity which will permit the later precipitation of a desired part thereof as a carbonate, through the action upon the solution of carbon dioxide. The quantity and treatment with the lime is also such as to render possible the mechanical filtration of this carbonated solution prior to the final precipitation of the lime from the solution.

The quantity of lime so required varies from one per cent of calcium oxide, or its equivalent, in weight of solid matter in the raw cane sugar solution to fifteen per cent in weight of solid matter in the raw cane or beet juices, this percentage depending upon the degree of impurity, the density and nature of the sugar solution to be clarified. It can be determined in each particular case to meet the required conditions by judgment or experiment.

After the required quantity of lime has been added to the initial liquor, this mixture is heated to any temperature up to the boiling point. Thereupon carbon dioxide is passed in intimate mixture or contact through the mixture or solution until the alkalinity is reduced to a decided pink reaction to phenolphthalein indicator. This solution is subsequently filtered, which may be effected by any known or suitable kind of mechanical filter.

The clear liquor from the mechanical filter still contains lime in excess, which must be removed from the liquor. This is effected by any suitable reagent, and preferably by the usual treatment with phosphoric acid, or by a partial precipitation with carbon dioxide, the precipitation being completed with phosphoric acid, or by sodium phosphate, or by other suitable reagents as may be found desirable or convenient.

After the precipitation of the lime from the liquor, the latter is subjected to mechanical filtration, which filtration produces the clarified solution, ready for purification and decolorization by bone char or vegetable decolorizing carbons as desired.

I am aware of several known ways of treating sugar liquors with lime and at various temperatures. In such previous practice, in the beet sugar industry, from twenty to thirty per cent of calcium oxide, or its equivalent, in weight of solid matter in solution is employed; and in the cane sugar industry, from fifteen to twenty-five per cent of calcium oxide or its equivalent, in weight of solid matter is used. In these prior processes, the purpose is to obtain as complete a removal as possible of impurities and coloring matter, so as to produce white sugar from the solution without subsequent filtration by animal char or vegetable decolorizing carbon; hence the requirement for large quantities of lime in such processes.

The primary purpose of my clarification or carbonation process is to convert the impurities in the sugar liquor or solution into a form or condition for which char or vegetable carbons would have a more pronounced or greater affinity. That is, the char or vegetable carbons will remove from the solution by absorption (purifying and decolorizing) the resultant impurities much more efficiently than from sugar solutions which have not been treated by my process. The degree of purification and decolorizing effected by my process is subsidiary to the main purpose of preparing the solution for filtration, and in certain aspects more especially for treatment by my cycle filtration process.

For convenience I style my novel filtration process "cycle filtration", and to avoid multiplicity of claims herein, I have so termed it, in its different degrees of breadth, in the appended claims.

The invention in its broader aspects is not limited to the exemplarily described details of process or apparatus, but departures may be made therefrom within the scope of the appended claims without departing from the principles of the invention and without sacrificing its chief advantages.

What I claim is:

1. The process of filtering sugar-containing liquid containing impurities for which char exhibits differential absorption with a battery of filters containing char, comprising passing the impure liquid in series through a plurality of the char filters, periodically cutting out the filter that has been for the longest time under liquor pressure, and periodically cutting in a char filter filled with revivified char, in series with the filter that has been for the shortest time under liquor pressure.

2. The process of continuously filtering sugar-containing liquid containing impurities for which char exhibits differential absorption with a battery of char filters, consisting in passing the liquid in succession through a series of the filters, periodically cutting out the first filter of the series, periodically cutting in a filter containing revivified char at the end of the series, and sweetening off, washing, discharging and refilling the cut out filters with revivified char.

3. The process of filtering sugar-containing liquid containing impurities for which char exhibits differential absorption with a battery of char filters, consisting in passing the liquid in series through a part of the filters thereby forming in effect a long continuous filter, periodically cutting out that filter that has been for the longest time under liquor pressure, periodically cutting in a filter containing revivified char in series with that filter that has been for the shortest time under liquor pressure, whereby the battery is continuously in use and is periodically supplied with revivified char.

4. The process of filtering sugar-containing liquid containing impurities for which char exhibits differential absorption with a series of filters containing char, comprising the steps of passing the liquid in succession through the char filters, thus forming in effect a long continuous filter, periodically removing spent char at one end of said continuous filter, and periodically adding revivified char at the opposite end of said continuous filter.

5. The process of treating sugar-containing liquid, comprising treating with carbon dioxide, mechanically filtering, passing the liquid through a battery of filters containing char, the liquid being passed through a plurality of filters in succession, periodically cutting out the filter that has been for the longest time under liquor pressure, and periodically cutting in a filter filled with revivified char, in series with the filter that has been for the shortest time under liquor pressure.

6. The process of filtering sugar-containing liquid with a battery of filters containing char, comprising treating the liquid with lime, then treating with carbon dioxide, mechanically filtering, then passing the liquid in series through a plurality of the char filters, periodically cutting out the filter that has been for the longest time under liquor pressure, and periodically cutting in a char filter filled with revivified char, in series with the filter that has been for the shortest time under liquor pressure.

7. The process of filtering sugar-containing liquid with a series of filters containing char, comprising the steps of treating the liquid with less than 15% of lime as CaO with relation to the solids, treating with carbon dioxide, mechanically filtering, passing the liquid in succession through the char filters, thus forming in effect a long continuous filter, periodically removing spent char at one end of said continuous filter, and periodically adding revivified char at the opposite end of said continuous filter.

In testimony whereof, I have signed my name to this specification.

EUGENE E. BATTELLE.